Feb. 17, 1931.         H. G. TRENCH         1,792,783
SPRING SHACKLE
Original Filed Jan. 18, 1926    2 Sheets-Sheet 1
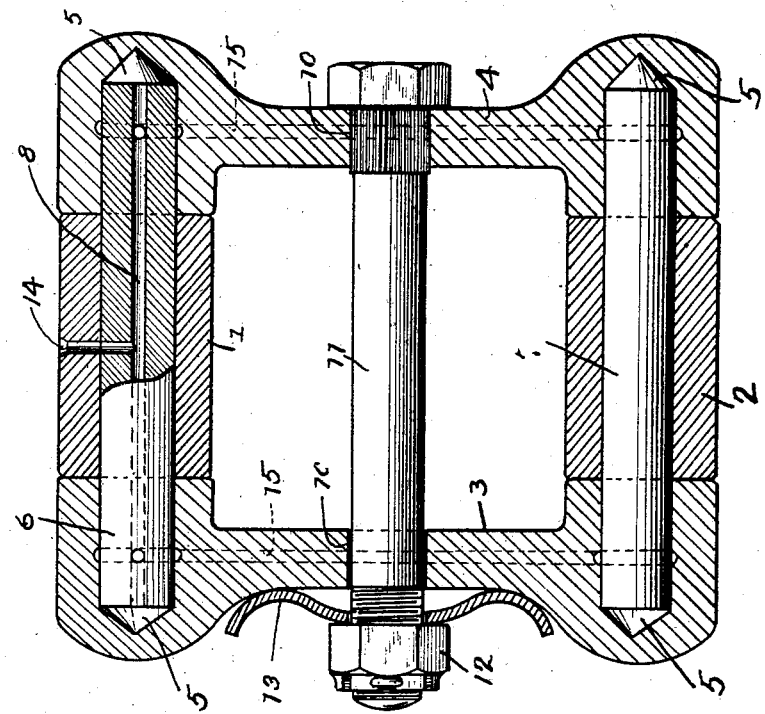
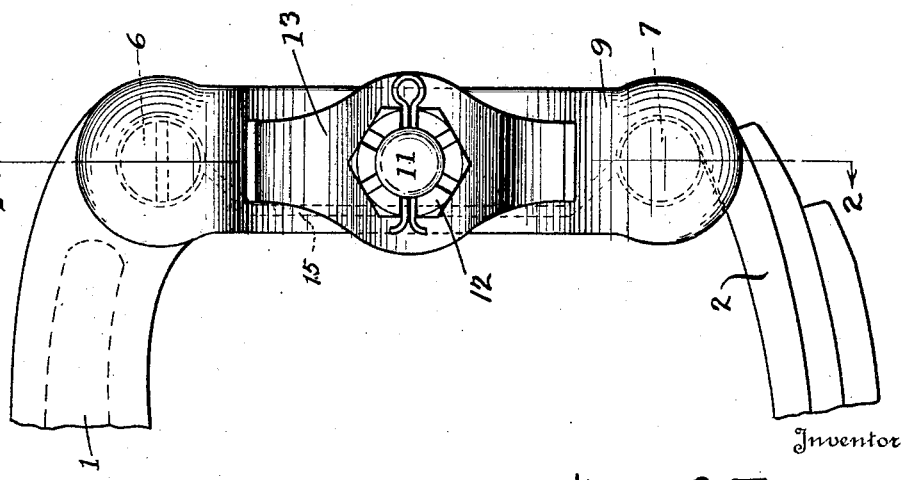
Inventor
Harry G. Trench
By Evans & McCoy
Attorneys

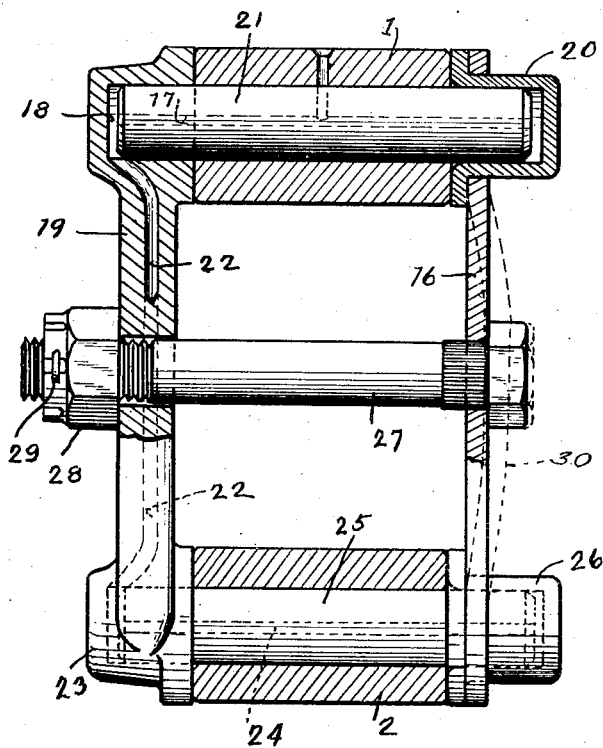

Patented Feb. 17, 1931

1,792,783

UNITED STATES PATENT OFFICE

HARRY G. TRENCH, OF HARTFORD, CONNECTICUT, ASSIGNOR TO THE UNION TRUST COMPANY, OF CLEVELAND, OHIO, A CORPORATION OF OHIO

SPRING SHACKLE

Original application filed January 18, 1926, Serial No. 81,947. Divided and this application filed May 26, 1927. Serial No. 194,293.

This invention relates to shackles for vehicle springs, and more particularly to a form of shackling unit that is an improvement over the constructions described in my Patent No. 1,042,173 that issued on October 20, 1912. This application is a division of my copending application Serial No. 81,947 that was filed on January 18, 1926 and is entitled "Spring shackles".

Constructions of this character are employed for connecting vehicle springs with the vehicle chassis in such manner as to permit relative movement between the end of the spring and the vehicle frame. The shackling unit herein described is primarily adapted to permit movement of the end of the spring relative to the vehicle frame, both in a longitudinal and lateral direction, while yieldingly restraining such movement, and to dampen relative motion of the spring, in order to prevent rattling or slapping of the shackling mechanism during operation of the vehicle.

One of the objects of this invention is to provide an improved form of shackling unit embodying the characteristic advantages of my previously proposed shackling unit, which shall be more easily assembled and shall have a single adjusting mechanism for regulating the degree of pressure applied by the shackle plates to the head of the vehicle spring and to the portion of the frame that carries the shackling unit.

An additional object of my invention is to provide a shackle mechanism that may be manufactured at less cost than the mechanism heretofore proposed and that is adapted to be lubricated from a single lubrication source.

An additional object of the invention is to provide a shackle unit that is adapted to be adequately lubricated from a central vehicle lubricating system.

Another object of the invention is to provide a shackle unit that is intended to be used without bushings in the vehicle spring head and frame support.

These and other objects will be apparent from a study of the accompanying drawings, wherein:

Figure 1 is a side elevational view, with parts broken away, of a shackle unit connecting a vehicle frame with one end of a suitable vehicle spring;

Fig. 2 is a cross sectional view taken substantially on line 2—2 of Fig. 1; and

Fig. 3 is a sectional view, corresponding in general to the view shown in Fig. 2, of a modified form of the invention.

The shackle unit shown in the accompanying drawings is used to connect a vehicle frame portion 1 with one end of a vehicle supporting spring 2, the vehicle parts being broken away close to the shackle unit because they constitute no part of my present invention and serve only to illustrate the mounting of the shackle unit on any desired form of vehicle.

The shackle unit shown in Figs. 1 and 2 comprises, together with other elements, a pair of opposed shackle plates 3 and 4 that respectively have a pintle-receiving bearing cup 5 formed at each end thereof for receiving the end portions of pintles 6 and 7 that are respectively carried by the frame projection 1 and the head of the vehicle supporting spring 2.

Each of the shackle plates 3 and 4 has an aperture 10 formed therein for receiving a transverse assembly bolt 11. The castellated nut 12 for the bolt 11 seats on a pressure spring 13 which is adapted to yieldingly maintain the shackle plates against the side faces of the spring head and the projecting portion of the vehicle frame.

The supporting pintle 6 is preferably fitted very tightly into the frame extension 1 in order that it will not turn within the frame support and also in order to avoid the use of a bushing therein. It will be noted in this connection that neither the frame 1 nor the spring head 2 carries a bushing for the supporting pintle. Movement of the pintle preferably occurs in the bearing sockets 5 of the shackle plates which are readily replaceable if they become worn.

A shackle unit of this form may conveniently be lubricated through a lubricant channel 14 that communicates with any desired source of lubricant supply such as a lubricating system for an entire vehicle. The pintle 6 has a lubricant channel 8 extending its entire length, and in communication with the supply channel 14. The shackle plates 3 and 4 preferably each have a channel 15 extending longitudinally thereof that carries the lubricant supplied by the channel 14 to each of the bearing sockets 5 of the shackle plate, although, in certain applications of the invention a single longitudinal channel 15 is sufficient for the lubrication of each bearing socket. A shackle of this character is shown in Fig. 3 of the drawings.

The removable character of the shackle plates 3 and 4 that are supported from the pintles 6 and 7 is of particular importance. If the pintles become worn it is a very simple matter to replace such elements by pressing them out of the supporting frame or the spring head and pressing another pintle into position. The plain unthreaded and headless cylindrical pintles are much less expensive than shackle bolts and the saving in expensive bushings for the spring head and frame is considerable.

Fig. 3 shows a modified form of shackle unit in which one of the shackle plates 16 may, if desired, be formed of a leaf spring that imposes the desired degree of pressure against the spring head and the frame. This shackle unit also embodies a centrally supplied lubricating channel 17 that conveys lubricating material in one direction to a bearing socket 18 that is formed in the rigid shackle plate 19 and in the other direction to a bearing cup 20 that is preferably formed of pressed metal and that is adapted to take the wear resulting from the movement of the pintle 21 relative to the shackle unit. Lubricant is also conveyed from the bearing cup 18 through longitudinal channel 22 of the shackle plate 19 to bearing cup 23 at the remote end of shackle plate 19. From the bearing cup 23 the lubricant is conveyed through the channel 24 that is formed in pintle 25 to a bearing cup 26 that is carried by the pintle 25. An assembly bolt 27 extends through an aperture formed in the rigid shackle plate 19 and also through an aperture formed in the yielding shackle plate 16. The adjustment nut 28 that is carried by the end of the assembly bolt 27 is locked in adjusted position by a cotter pin 29, or other suitable means. The nut is adapted to pull the leaf spring 16 from its initially curved form, as indicated by the dotted line 30, to the position shown in solid outline in the drawings. The degree of flexure obtained in the spring plate 16 is so arranged as to give the desired lateral pressure upon the spring head and the frame support. It is desired, however, that the spring 16 be substantially flat in its ultimate adjusted position.

The bearing cups 20 and 26 are preferably of pressed metal having a bearing pocket that is just large enough to snugly fit over the end of the corresponding pintle to provide a bearing support therefor. Each of the bearing cups fit snugly within a suitably formed aperture in the corresponding end of the spring 16 which serves as a shackle plate for one side of the unit.

The operation of this shackle plate corresponds closely to the operation of the shackle plates previously described. In addition to avoiding costly bushings, this construction avoids the use of one of the supplemental springs for imposing pressure tending to hold the shackle plates against the spring head. It will also be noted that the pintle is entirely enclosed and that dust and other foreign material is excluded from the connections by the close fit of the bearing cups with the frame and spring head.

The advantages of shackle units that are adapted for central lubrication systems and that are so formed as to avoid the use of bushings, headed and threaded shackle bolts and that are inexpensive to manufacture will be apparent to those skilled in the art. Each of the proposed forms of shackle units is intended to be used both as suspension and as compression shackle units.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claim.

What I claim is:

The combination with vehicle spring and frame members, of a shackle unit comprising pintles mounted in and extending transversely through the spring and frame members, one of said pintles having a lubricant channel extending from one end to the other thereof and the member in which it is mounted having a lubricant supplying channel communicating with the lubricant channel of the pintle, a pair of shackle plates each having a pintle receiving cup at each end and having transversely alined apertures intermediate the cups, each plate having a lubricant channel extending longitudinally through the same past the apertures thereof from one cup to the other, and an assembly bolt passing through said apertures of the shackle plates for clamping the shackle plates against said spring and frame members with the projecting ends of the pintles in said cups.

In testimony whereof I affix my signature.

HARRY G. TRENCH.